Dec. 30, 1958     R. L. COLSON     2,866,422
SOIL-TREATING APPARATUS
Filed April 19, 1956     4 Sheets-Sheet 3

INVENTOR
*Raymond L. Colson*
BY
*Burns, Doane, Benedict & Swecker*
ATTORNEYS

Dec. 30, 1958 R. L. COLSON 2,866,422
SOIL-TREATING APPARATUS
Filed April 19, 1956 4 Sheets-Sheet 4

INVENTOR
Raymond L. Colson

BY
ATTORNEYS

United States Patent Office 2,866,422
Patented Dec. 30, 1958

2,866,422

SOIL-TREATING APPARATUS

Raymond L. Colson, Long Beach, Miss.

Application April 19, 1956, Serial No. 579,296

12 Claims. (Cl. 111—6)

This invention relates to agricultural machines and, more particularly, to apparatus for injecting soil-treating fluid material into the ground below the surface thereof.

Smooth cultivated grass plots, such as golf greens and the like, require frequent and meticulous treatment to maintain the soil fertile and the grass healthy. It is especially important that repeated applications of soil-treating fluid material, such as liquid fertilizer and the like, be made. To obtain optimum results, the liquid fertilizer or similar soil-treating material should be injected below the surface of the ground near the grass roots without appreciably disturbing the turf.

Apparatus for injecting the soil-treating material into the ground below the surface thereof by means of slender tubes or needles is not broadly new. This invention resides in certain improvements in such apparatus which enables more efficient operation and improved results to be obtained.

It is a primary object of this invention to provide an improved apparatus for dispensing soil-treating fluid material rapidly and efficiently and with a minimum expenditure of power into a large area of ground below the surface thereof without appreciably disturbing the soil.

It is another object of the invention to provide such an improved apparatus including a rotary member with a plurality of injection tubes spaced longitudinally thereof and extending outwardly therefrom for ground penetration and withdrawal during rolling movement of the rotary member and improved means to direct the fluid material to the injection tubes which requires a minimum of fluid-moving power.

It is an additional object of this invention to provide such an improved apparatus including a drum having a plurality of injection tubes extending outwardly from the peripheral surface thereof for ground penetration and withdrawal during rolling of the drum and improved means to direct the fluid material to the injection tubes which results in economical operation and minimizes leakage into the drum.

It is a still further object of this invention to provide such an improved apparatus which includes means to remove leakage as it accumulates.

These and other objects will become more apparent from the description of the specific embodiment illustrated on the drawings and specifically described hereinafter.

Figure 1:
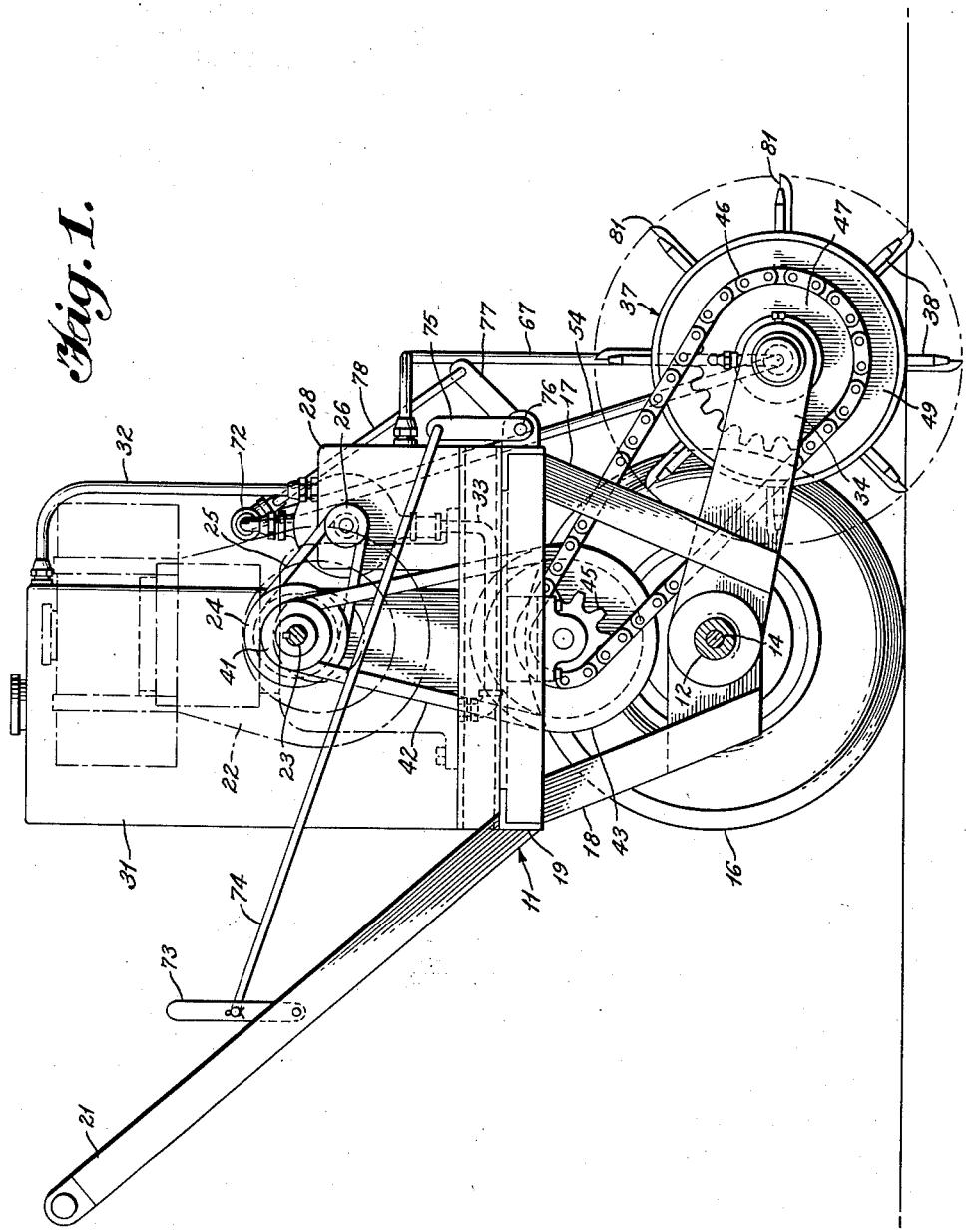
Figure 1 is a view partially in section and partially in side elevation showing the apparatus of the invention.

The apparatus of the invention includes a frame designated generally by the reference numeral 11 which includes a plurality of framing and bracing members, only sufficient of which are disclosed to enable a complete understanding of the invention. The frame includes a pair of axle housings 12 and 13 in which is rotatably mounted axle 14 on the opposite ends of which are mounted wheels 15 and 16. Supported above axle housings 12 and 13 by means of vertical legs 17 and 18 is a table 19 constructed of a plurality of pieces of angle iron. Mounted on and projecting rearwardly from table 19 is a handle 21.

Mounted on top of table 19 is a motor 22. The motor 22 may be an internal combustion engine as shown; but it will be understood that any suitable type of prime mover, such as an electric motor, may be substituted for the internal combustion engine. Through shaft 23, pulley 24, belt 25, pulley 26, and shaft 27, motor 22 operates a rotary vacuum pump 28 of any suitable commercial type which preferably is equipped with a suitable filter and sediment chamber. Shaft 27 is further connected to a rotary fluid pump 29 of any suitable commercial type. Also mounted on table 19 is a receptacle 31 for liquid fertilizer or other suitable soil-treating fluid material. The top of receptacle 31 is connected by means of conduit 32 to the discharge end of vacuum pump 28. The lower end of receptacle 31 is connected to the inlet side of pump 29 by means of conduit 33.

Figure 2:
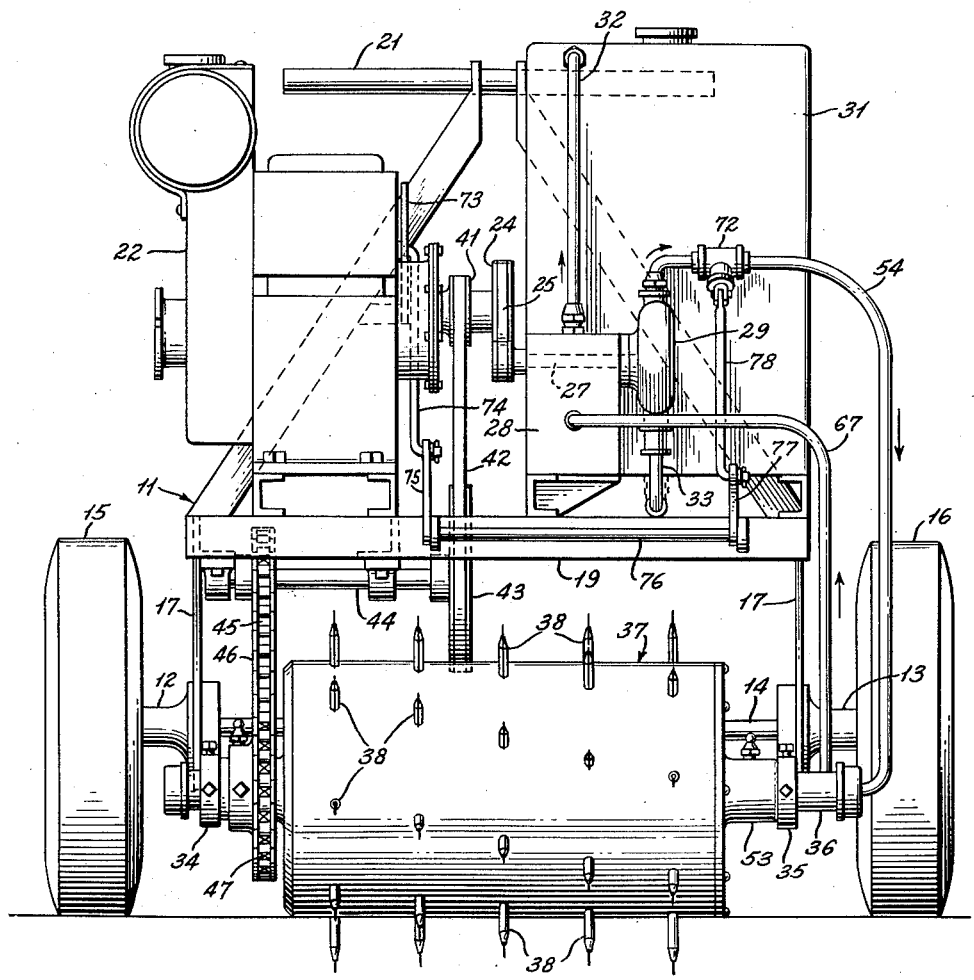
Figure 2 is a view in front elevation showing the apparatus of the invention.
Figure 3:
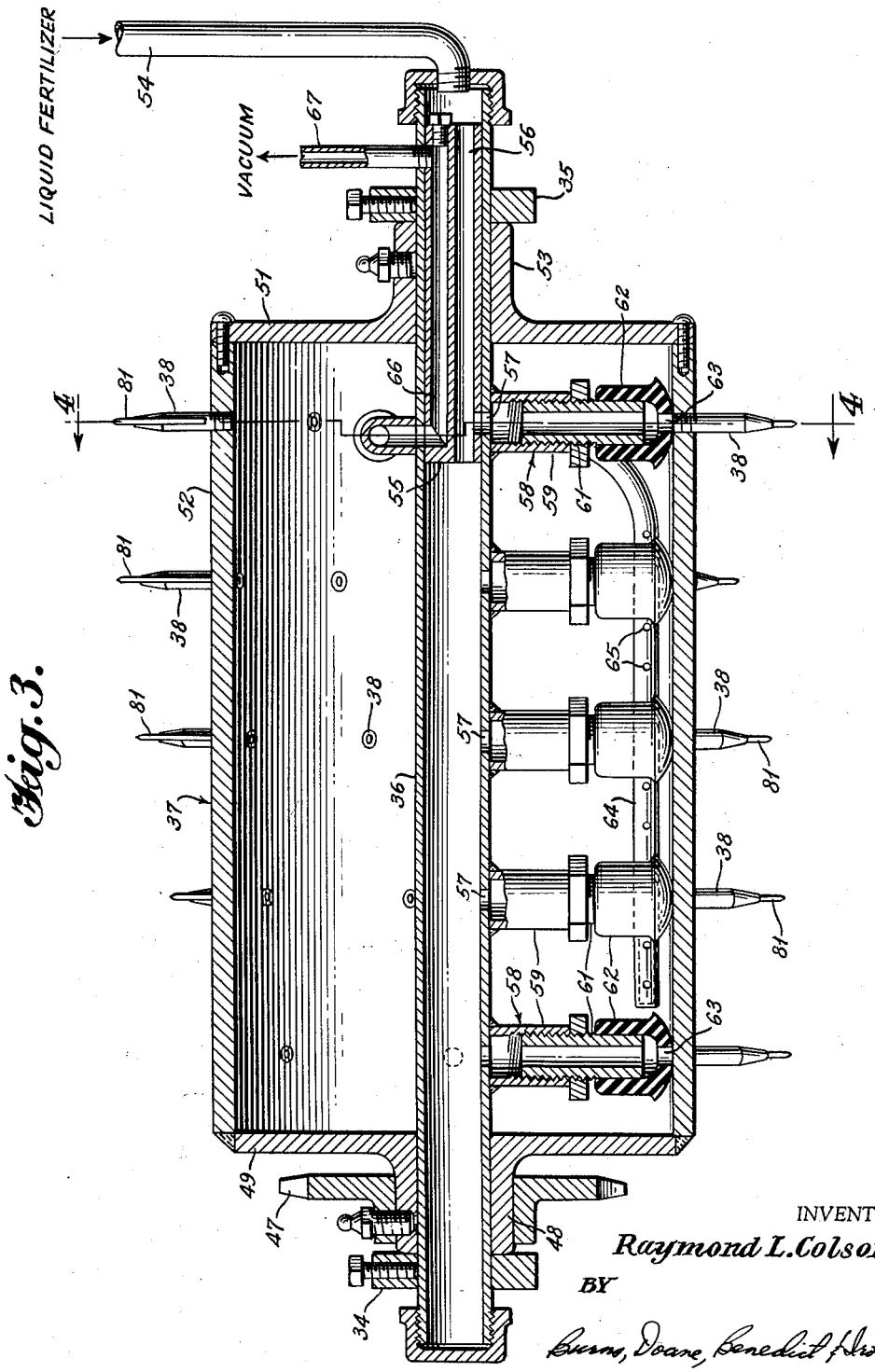
Figure 3 is a vertical sectional view taken axially through the rotary soil-injecting drum forming a part of the apparatus of the invention.
Figure 4:
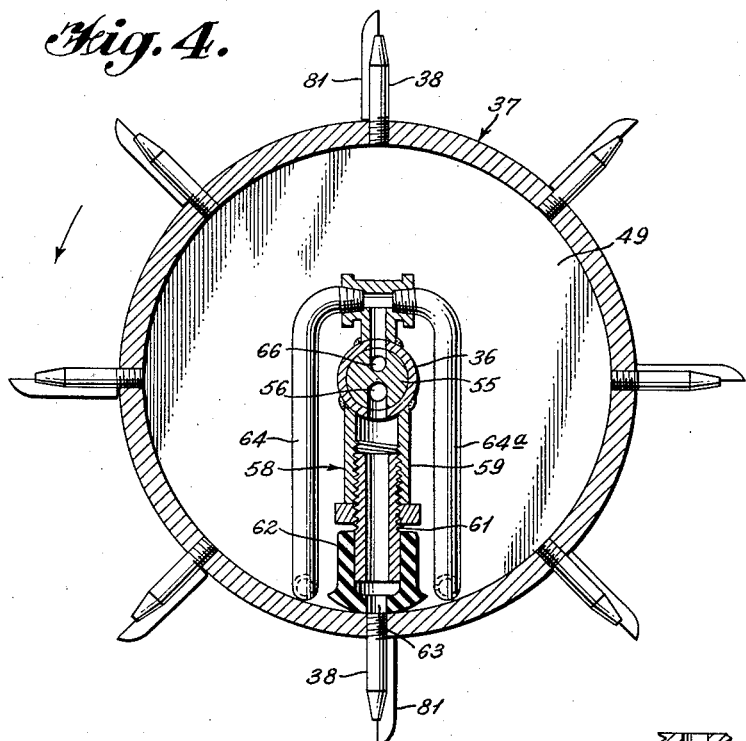
Figure 4 is a vertical sectional view taken in the direction of the arrows along line 4—4 of Figure 3.

Frame 11 is also equipped with forwardly extending arms 34 and 35 and a tubular axle 36 which is non-rotatably mounted between such arms. Rotatably mounted on tubular axle 36 is a rotary member comprising a drum 37. A plurality of slender needle-like injection tubes 38 are mounted on drum 37 to project outwardly therefrom for ground penetration and withdrawal during rolling of the drum along the surface of the ground. As best illustrated in Figures 2, 3 and 4, the tubes are arranged in a plurality of rows. In each row, the tubes 38 are spaced circumferentially around the peripheral surface of drum 37. Longitudinally of the drum, the various rows are spaced from each other; and the tubes in each row are generally disaligned with the tubes in the other rows to reduce the number of tubes in any line parallel to the axis of the drum 37. This is accomplished by arranging the tubes in substantially a helical pattern extending longitudinally of the drum. Preferably, no two of the tubes 38 are aligned parallel with the axis of the drum for a purpose more fully described hereinafter. It will be understood, however, that there might be alignment of a few tubes which would not substantially affect the advantages gained by general disalignment as set forth.

Rotation is imparted to the drum by means of motor 22 through shaft 23, pulley 41, belt 42, pulley 43, shaft 44, sprocket 45, chain 46, and sprocket 47, which is rigidly mounted on tubular boss 48, extending outwardly from the vertical wall 49 of drum 37. The other vertical wall 51 of drum 37 is removably attached to the peripheral wall 52 to permit access to the interior of the drum 37. End wall 51 is also provided with a tubular boss 53. The tubular bosses 48 and 53 and consequently the drum 37 are rotatable with respect to tubular axle 36. It will be understood that means may be provided to apply power directly to the wheels 15 and 16 in addition to or instead of the drum 37. Further, if no power means is provided, the apparatus of the invention may be propelled by manual pushing.

Liquid fertilizer is pumped through conduit 54 into the hollow passageway inside of tubular axle 36 which forms an inlet pipe extending through drum 37. At the inlet end of tubular axle 36 is positioned a plug member 55 having longitudinal passageway 56 extending therethrough. The liquid fertilizer passes through passageway 56, through openings 57 in the underside of tubular axle 36 and into vertical conduits 58 which include threadedly engaged female duct member 59 and male duct member 61. The end portions of the conduits 58 are formed by resilient tubular members 62 which are preferably made of rubber. The outlets 63 of tubular members 62 are aligned circumferentially of the drum 37 with the tubes 38 in the various rows. Thus, during rolling of the drum 37, the fluid material is directed through outlet 63 into each tube 38 only as it passes the lower portion of the path of rotation of the drum 37. When no tube 38 is passing beneath outlet 63, the end of tubular member 62 slidingly engages the inner surface of drum 37 in sealing relationship to prevent undue leakage of the fluid material into the drum. Each of the tubular members 62 of the conduits 58 is aligned circumferentially of the drum 37 with a different row of tubes 38. However, by virtue of the general disalignment of each of the tubes in the various rows from each other longitudinally of the drum as hereinbefore described, and since the conduits 58 are aligned with each other longitudinally of the drum, fluid material will be directed to a number of tubes 38 which is considerably less than the number of rows of tubes. There will be a corresponding reduction in the pressure required to force the fluid material through the tubes. Preferably, there is only one tube in any one line parallel to the axis of the drum 37. This enables the full pressure exerted by pump 29 to be used in forcing fluid through only one tube 38 at any one time. This, of course, requires considerably less pressure and thus less power than would be required if fluid were forced through a plurality of tubes simultaneously. Further, there will be a uniform amount of fluid injected through each tube.

In the event there is some leakage of fluid past the tubular members 62 into the drum, a pair of exhaust conduits 64 and 64a are positioned on opposite sides of conduits 58. Each of the conduits 64 and 64a is provided with spaced multiple outlets 65 positioned in the lower portion of drum 37 facing and closely adjacent to the outlets 63 near the inner surface of the drum 37 at the lower portion of the path of rotation thereof. Vacuum pump 28 is utilized to apply suction to exhaust conduits 64 and 64a through a second passageway 66 in plug member 55 and vacuum conduit 67 to remove any liquid which may collect in the drum 37.

In order that the flow of liquid fertilizer or other fluid material to the injection apparatus may be carefully controlled, a valve 72 is positioned in conduit 54. The valve 72 is in turn controlled by the operator by the manipulation of valve handle 73 which is connected to the valve 72 by a suitable linkage consisting of link 74, lever 75, shaft 76, lever 77, and link 78.

Figure 5:
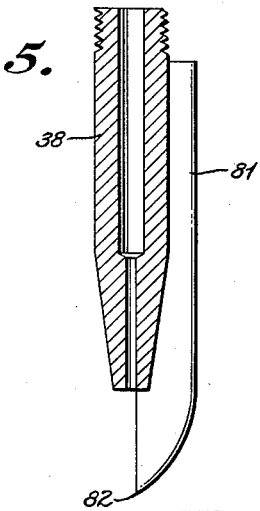
Figure 5 is a vertical sectional view taken longitudinally through one of the injection tubes forming a part of the apparatus of the invention.

Attached to each tube 38 and extending outwardly therefrom is a knife member 81. The tip 82 of knife member 81 extends radially outwardly beyond the end of tube 38 and the knife blade is curved forwardly and upwardly from the tip, as best seen in Figures 4 and 5, so as to cut any tough grass runners which may be in the path of the tubes 38 as they penetrate and are withdrawn from the ground during rolling of drum 37 in the direction of the arrow shown in Figure 4. This is particularly advantageous since it minimizes the turf disturbance whereas relatively large depressions and undue disturbance of the soil will often result when injection tubes are inserted into the grassy soil without the use of a knife blade preceding the injection tube.

Figure 6:
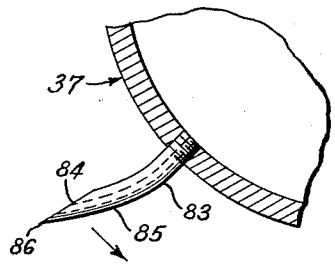
Figure 6 is a fragmentary vertical sectional view showing an alternative embodiment of an injection tube.

In Figure 6, there is disclosed an alternate embodiment of injection tube designated by the reference numeral 83 which is slightly curved rearwardly with respect to the direction of rotation shown by the arrow. This slight curvature permits removal of the tube from the ground with less disturbance of the turf. Further, the end 84 of tube 83 forms an acute angle with the front wall 85 with a sharpened edge 86 therebetween which cuts tough grass runners prior to the insertion of the tube 83. This eliminates the necessity for a separate knife member. During ground penetration, the knife edge 86 enters the ground first and opens up and loosens the soil which may be packed hard. Thus, no difficulty is encountered in injecting the soil-treating fluid material through the opening in the end 84 of the tube 83 into the loosened soil.

When motor 22 is actuated, rolling movement is imparted to the drum 37 and the soil-treating apparatus is moved across the surface of the ground guided by the operator grasping the handle 21. By manipulation of the valve handle 73, the operator may control the flow of liquid fertilizer to the drum 37. The fluid material flows downwardly through conduits 58 and into the soil through the tubes 38 as they pass the lower portion of their path of rotation around the drum 37. Any of the fluid material which leaks into the drum 37 is removed by the suction applied through exhaust conduits 64 and 64a. The leakage is returned through conduit 67, vacuum pump 28 and conduit 32 to the top portion of receptacle 31, any sediment being removed by the filter associated with vacuum pump 28 and collected in the sediment chamber. Thus as the drum moves along the surface, the fluid material is injected into the ground below the surface thereof through the tubes 38. A relatively large area of lawn may be covered in a relatively short time, and there is substantially no disturbance of the soil.

In addition to fertilizing the soil, the injection of the fluid material effects a loosening of the turf which becomes packed hard when it is repeatedly walked upon by people. Whereas golf greens normally require frequent aeration by the removal of cylindrical plugs of turf to compensate for the hard packing of the turf, there is no such requirement when the apparatus of this invention is used.

There has been illustrated and described what is considered to be the preferred embodiment of the invention. It will be understood, however, that various modifications may be made without departing from the broader scope of the invention as described by the following claims.

What is claimed is:

1. An apparatus for injecting soil-treating fluid material into the ground below the surface thereof which comprises a frame, a drum rotatably connected to said frame for rolling contact with the surface of the ground, said drum having a plurality of openings extending outwardly from an interior surface thereof, said openings being circumferentially spaced around the peripheral surface of said drum in a row normal to the axis thereof, a plurality of fluid conducting tubes connected to said openings and projecting outwardly from said drum for ground penetration and withdrawal during rolling of said drum, a fluid material supply pipe carried by said frame and connectable to a source of fluid material under pressure, said pipe extending axially within said drum, and a conduit connected to said pipe to receive fluid material therefrom and extending radially downwardly therefrom, said conduit being non-rotatable relative to said frame and having an outlet portion slidably engaging in sealing relationship said interior surface of said drum at the lower portion of the path of rotation thereof, said outlet portion being radially aligned with said openings to direct fluid to each tube while it is passing said outlet portion during rolling of said drum.

2. An apparatus as recited in claim 1 wherein said conduit has a resilient outlet portion.

3. In an apparatus for injecting soil-treating fluid material into the ground below the surface thereof, a frame, a drum rotatably connected to said frame for rolling contact with the surface of the ground, said drum having a plurality of openings extending outwardly from an interior surface thereof, said openings being circumferentially spaced around the peripheral surface of said drum in a row normal to the axis thereof, a plurality of fluid conducting tubes connected to said openings and projecting outwardly from said drum for ground penetration and withdrawal during rolling of said drum, conduit means connected to said frame and extending axially into said drum, means to connect said conduit to a source of fluid material under pressure, said conduit means having an outlet portion extending downwardly and slidably engaging in sealing relationship said interior surface of said drum at the lower portion of the path of rotation thereof, said outlet portion being non-rotatable relative to said frame and radially aligned with said openings to direct fluid to each tube only while it is passing said outlet portion during rolling of said drum, and suction means carried by said frame and having an inlet positioned in the lower portion of the interior of said drum to remove fluid leakage therefrom.

4. An apparatus for injecting soil-treating fluid material into the ground below the surface thereof comprising a frame, a drum rotatably connected to said frame for rolling contact with the surface of the ground, said drum having a plurality of openings extending outwardly from a circular interior surface thereof, said openings being arranged in a plurality of rows spaced longitudinally of said drum, each of said rows being normal to the axis of said drum, a plurality of fluid conducting tubes connected to said drum to receive fluid which flows outwardly through said openings and projecting outwardly from said drum for ground penetration and withdrawal during rolling of said drum, a fluid material supply pipe carried by said frame and connectible to a source of fluid material under pressure, said pipe extending axially within said drum, and a plurality of conduits connected to said pipe to receive fluid material therefrom and extending downwardly therefrom, each of said conduits being non-rotatable relative to said frame and having an outlet portion slidably engaging in sealing relationship said interior surface of said drum at the lower portion of the path of rotation thereof, said outlet portions being radially aligned with the openings in said rows to direct fluid to said tubes only while said tubes are penetrating the ground during rolling of said drum.

5. An apparatus as recited in claim 4 wherein each of said conduits has a resilient outlet portion.

6. An apparatus as recited in claim 4 wherein said tubes are curved rearwardly of the direction of rotation of said drum, each of said tubes having an end portion inclined angularly relative to the sides of the tubes and an outlet positioned intermediate the edges of said end portion.

7. An apparatus for injecting soil-treating fluid material into the ground below the surface thereof comprising a frame, a drum rotatably connected to said frame for rolling contact with the surface of the ground, said drum having a plurality of openings extending outwardly from a circular interior surface thereof, said openings being arranged in a plurality of rows spaced longitudinally of said drum, each of said rows being normal to the axis of said drum, a plurality of fluid conducting tubes connected to said drum to receive fluid which passes outwardly through said openings and projecting outwardly from said drum for ground penetration and withdrawal during rolling of said drum, each of said tubes having a knife member attached thereto and extending radially outwardly therefrom, a fluid material supply pipe carried by said frame and connectable to a source of fluid material under pressure, said pipe extending axially within said drum, and a plurality of conduits connected to said pipe to receive fluid material therefrom and extending downwardly therefrom, each of said conduits being non-rotatable relative to said frame and having an outlet portion slidably engaging in sealing relationship said interior surface of said drum at the lower portion of the path of rotation thereof, said outlet portions being radially aligned with the openings in said rows to direct fluid to said tubes only while said tubes are penetrating the ground during rolling of said drum.

8. An apparatus for injecting soil-treating fluid material into the ground below the surface thereof which comprises a frame, a drum rotatably connected to said frame for rolling contact with the surface of the ground, said drum having a plurality of openings extending outwardly from a circular interior surface thereof, said openings being arranged in a plurality of rows spaced longitudinally of said drum, each of said rows being normal to the axis of said drum, a plurality of fluid conducting tubes connected to said drum to receive fluid which flows outwardly through said openings and projecting outwardly from said drum for ground penetration and withdrawal during rolling of said drum, conduit means connected to said frame and extending axially into said drum, means to connect said conduit means to a source of fluid material under pressure, said conduit means having a plurality of outlet portions extending downwardly and slidably engaging in sealing relationship said interior surface of said drum at the lower portion of the path of rotation thereof, said outlet portions being non-rotatable relative to said frame and radially aligned with the openings in said rows to direct fluid into said tubes only when they are penetrating the ground during rolling of said drum, a suction conduit carried by said frame and having an inlet opening in the lower portion of the interior of said drum, and means associated with said suction conduit to connect said suction conduit with a source of suction to remove fluid leakage from the lower portion of the interior of said drum.

9. In an apparatus for injecting soil-treating fluid material into the ground below the surface thereof, a frame, a drum rotatably connected to said frame for rolling contact with the surface of the ground, said drum having a plurality of openings extending outwardly from a circurlar interior surface thereof, said openings being arranged in a plurality of rows spaced longitudinally of said drum, each of said rows being normal to the axis of said drum, the openings in each row being generally disaligned longitudinally of said drum with the openings in the other rows to reduce the number of openings in any line parallel to the axis of said drum, a plurality of fluid conducting tubes connected to said drum to receive fluid which flows outwardly through said openings and projecting outwardly from said drum for ground penetration and withdrawal during rolling of said drum, conduit means connected to said frame and extending into said drum, and means to connect said conduit means to a source of fluid material under pressure, said conduit means having outlet portions extending downwardly and slidably engaging in sealing relationship said interior surface of said drum at the lower portion of the path of rotation thereof, said outlet portions being non-rotatable relative to said frame and radially aligned with the openings in said rows to direct fluid to said tubes only when said tubes are penetrating the ground during rolling of said drum.

10. In an apparatus for injecting soil-treating fluid material into the ground below the surface thereof, a frame, a drum rotatably connected to said frame for rolling contact with the surface of the ground, said drum having a plurality of openings extending outwardly from a circular interior surface thereof, said openings being arranged in a plurality of rows spaced longitudinally of said drum, each of said rows being normal to the axis of said drum, the openings in each row being generally disaligned longitudinally of said drum with the openings in the other rows to reduce the number of openings in any line parallel to the axis of said drum, a plurality of fluid conducting tubes connected to said drum to receive fluid which flows outwardly through said openings and projecting outwardly from said drum for ground penetration and withdrawal during rolling of said drum, a fluid material supply pipe carried by said frame and connectable to a source of fluid material under pressure, said pipe extending axially within said drum, a plurality of conduits connected to said pipe to receive fluid material therefrom and extending radially downwardly therefrom, said conduits being non-rotatable relative to said frame and having outlet portions slidably engaging in sealing relationship said interior surface of said drum at the lower portion of the path of rotation thereof, said outlet portions being radially aligned with the openings in said rows to direct fluid to said tubes only when said tubes are penetrating the ground during rolling of said drum, and suction means carried by said frame and having an inlet positioned in the lower portion of the interior of said drum to remove fluid leakage therefrom.

11. In an apparatus for injecting soil-treating fluid material into the ground below the surface thereof, a frame, a drum rotatably connected to said frame for rolling contact with the surface of the ground, a plurality of fluid-conducting tubes mounted on the peripheral surface of said drum and extending outwardly therefrom for ground penetration and withdrawal during rolling of said drum, said tubes being arranged in a plurality of rows normal to the axis of said drum and spaced therealong, the inner end of each of said tubes forming an opening in a circular interior surface of said drum, and conduit means non-rotatably carried by said frame and connectable to a source of fluid material, said conduit means extending longitudinally into said drum and having a plurality of downwardly extending outlet portions radially aligned with said rows of tubes and slidably engaging in sealing relationship said interior surface of said drum at the lower portion of the path of rotation thereof to direct fluid only to the tubes which are penetrating the ground during rolling of said drum.

12. In an apparatus for injecting soil-treating fluid material into the ground below the surface thereof, a frame, a drum rotatably connected to said frame for rolling contact with the surface of the ground, a plurality of fluid-conducting tubes mounted on the peripheral surface of said drum and extending outwardly therefrom for ground penetration and withdrawal during rolling of said drum, said tubes being arranged in a plurality of rows normal to the axis of said drum and spaced therealong, the inner end of each of said tubes forming an opening in a circular interior surface of said drum, a tank carried by said frame to contain soil-treating fluid material, conduit means non-rotatably carried by said frame and extending longitudinally into said drum, means carried by said frame to deliver fluid material under pressure from said tank to said conduit means, said conduit means having a plurality of downwardly extending outlet portions radially aligned with said rows of tubes and slidably engaging in sealing relationship said interior surface of said drum at the lower portion of the path of rotation thereof to direct fluid material only to the tubes which are penetrating the ground during rolling of said drum, a suction conduit non-rotatably carried by said frame and having an inlet opening positioned in the lower portion of the interior of said drum, and means carried by said frame to apply suction to said suction conduit and to deliver fluid leakage from the lower portion of the interior of said drum to said tank.

References Cited in the file of this patent

UNITED STATES PATENTS

| 7,273 | Price | Apr. 9, 1850 |
| 581,416 | Dunn et al. | Apr. 27, 1897 |
| 1,171,277 | Thayer | Feb. 8, 1916 |
| 2,072,331 | Hanna | Mar. 2, 1937 |
| 2,384,469 | Kalix | Sept. 11, 1945 |
| 2,649,061 | Hawkins et al. | Aug. 18, 1953 |

FOREIGN PATENTS

| 225,866 | Germany | Sept. 21, 1910 |